Patented June 23, 1942

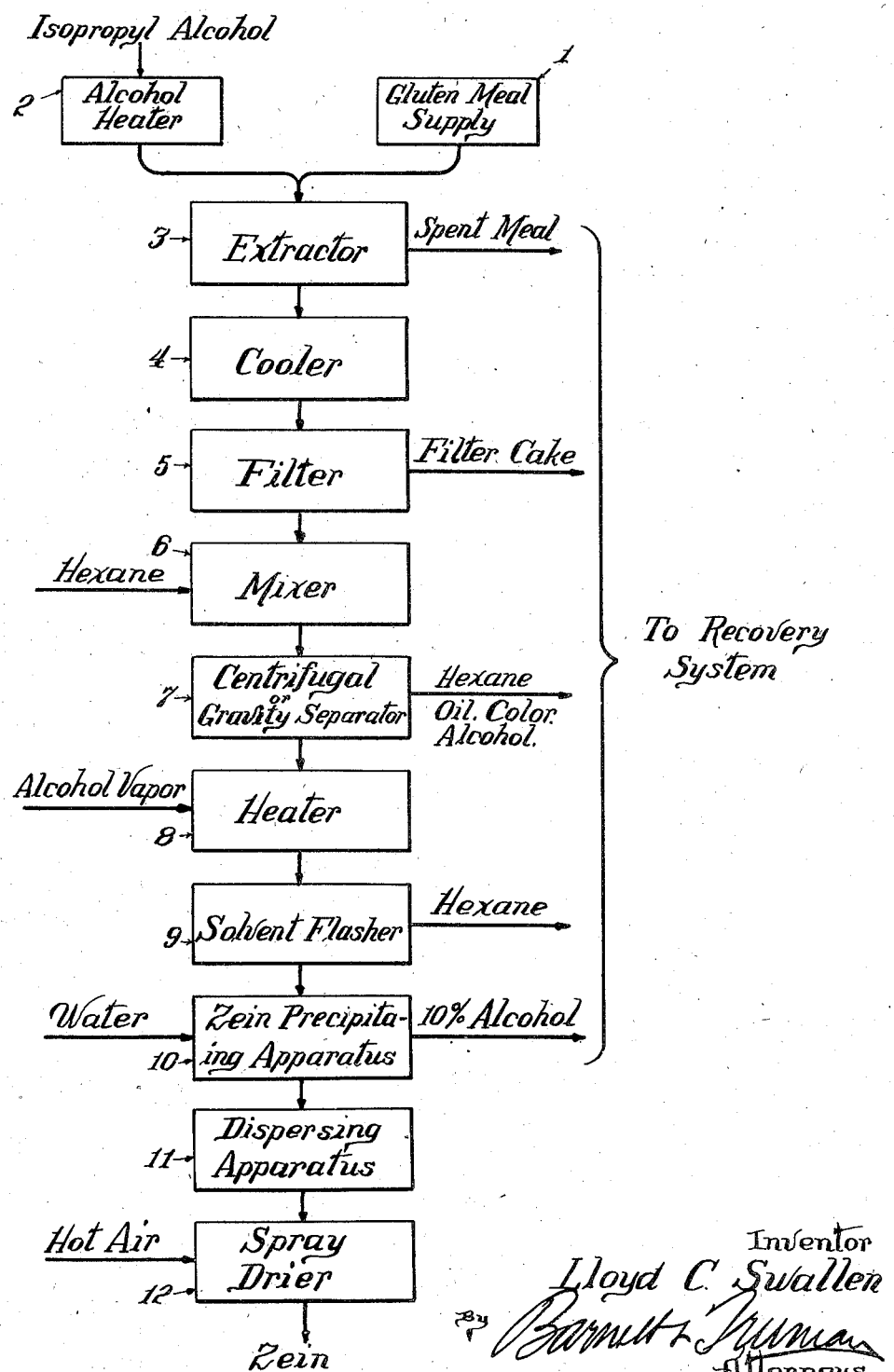

2,287,649

UNITED STATES PATENT OFFICE 2,287,649

PROCESS FOR THE PRODUCTION OF ZEIN

Lloyd C. Swallen, Pekin, Ill., assignor to Corn Products Refining Company, New York, N. Y., a corporation of New Jersey Application November 14, 1938, Serial No. 240,307

7 Claims. (Cl. 260—123)

This invention relates to the production of zein, the alcohol soluble part of corn (maize) protein, and more particularly (although not exclusively, as to certain features of the invention) to the production of a type of zein having certain characteristics which give it special utility in the arts, for example, when used with solvents in the manufacture of coatings, impregnating solutions, adhesives, sizes, vehicles for pigments, and the like. The particularly desired characteristics are solubility and solution stability, that is, the capacity of the zein to be completely dissolved in the solvent used, strong ethyl alcohol for example, or other equivalent zein solvent, and to remain in solution for a considerable period of time as against the tendency to denature and forms gels. Zein having the desired characteristics may be defined as a substance which consists of about 50% of the protein in corn gluten, which is substantially completely soluble in 95% ethyl alcohol (volume basis), at about 25° C. (77° F.) in the proportion of 1 part by weight of zein to 3 parts by weight of ethyl alcohol, and which is at least 95% soluble in 92% ethyl alcohol (volume basis) in the proportion of 1.25 parts by weight of zein to 100 parts of alcohol. This refers to commercial air dry zein having the usual moisture content of about 8% by weight.

A process may be employed for producing, from gluten meal, zein having these characteristics, by the use of ethyl alcohol as the zein solvent in concentrations between 86% and 92% by volume and at extraction temperatures between 40° C. (104° F.) and 65° C. (149° F.).

The process of zein extraction at these high alcohol concentrations gives a product which is quite different from, and superior in the respects above noted, to zein produced by extraction with ethyl alcohol of say 60% concentration (by volume). Apparently the extraction at the lower alcohol concentrations removes from the protein fractions which are not removed by the alcohol of higher concentrations and it is these fractions which impair the solubility and solution stability of the product.

The present invention is based upon the discovery that zein of the type referred to may be produced more advantageously by the use of isopropyl alcohol in the place of ethyl alcohol. The advantages, among others, are: It is possible to use hexane, as an oil and color solvent in place of benzol or its homologues used in the ethyl alcohol process of the above mentioned application. In extracting at high alcohol concentrations the extract will contain some oil and coloring matter, so that for most purposes for which the zein is intended, it is necessary to remove such oil and coloring matter from the extract. In this operation and in the subsequent recovery of the zein and oil solvents, the use of hexane as an oil and color solvent has certain advantages over benzol which will be adverted to later. Furthermore, in respect to the zein solvent no government license is necessary for the use of isopropyl alcohol, whereas ethyl alcohol is taxed and its use restricted by governmental regulations. The isopropyl alcohol can be used in a pure state whereas, in commercial operations, it is practically necessary to use a denatured ethyl alcohol which is a complex mixture and involves consequent uncertainties in process and product. It is possible to use isopropyl alcohol at lower concentrations than ethyl alcohol and still obtain a product having the same characteristics, that is, a product which will meet the requirements as to solubility and solution stability specified above. In the recovery system the isopropyl alcohol makes possible the use of a smaller still and less steam. Isopropyl alcohol is easier to rectify with less reflux to the column. In order to get products of similar characteristics the dilute ethyl alcohol of the recovery system has to be distilled to say 92% concentration (by volume) whereas the isopropyl alcohol, in order to fit it for re-use, need be concentrated only to about 85% concentration. These differences, therefore, involve economies and conveniences throughout the process.

The invention has for one of its primary objects the provision of a process having the advantages just specified.

In place of hexane it would be possible to use other petroleum hydrocarbons having boiling points between 50° and 100° C. (122° F.–212° F.); and such petroleum hydrocarbons are to be considered as the equivalents of hexane. However, it is noted that if the boiling point of the solvent is too high, it is necessary to use too much steam, for economy, in the still. If the boiling point of the solvent is too low, there will be solvent losses unless the recovery is under pressure or with refrigeration.

The principal reasons for using hexane rather than benzol, as an oil and color solvent are avoidance of toxicity and lower cost. Other advantages are in the operation of the recovery system in which the alcohol and oil and color solvent are recovered and reused.

Hexane as an oil solvent is not desirable where aqueous ethyl alcohol is used, as is commonly the case, as a zein solvent in the extraction of zein from corn gluten; although applicant has discovered that the use of hexane with ethyl alcohol is possible under the strictly limited conditions specified in copending application of the applicant Serial No. 287,619, filed July 31, 1939, (patented February 10, 1942, as No. 2,272,488), conditions which involve the necessity of very strict control of the process not always possible commercially and in any event very undesirable in practical operations. The reason why hexane cannot be used when ethyl alcohol is employed as a zein solvent (except under the limited conditions mentioned) is that it is not miscible enough with aqueous ethyl alcohol, in the concentrations necessary for producing zein in practical yields. When hexane is mixed with an aqueous ethyl alcohol solution of zein having an alcohol concentration lower than that specified in application 287,619, or if the hexane is used in larger amount than is there specified, a three phase system will result giving an upper layer consisting of hexane, a middle layer consisting of alcohol, hexane and water, in which zein has a limited solubility, and a lower layer consisting of a concentrated zein solution. This will involve, necessarily, a loss of zein in the middle layer. Under different conditions such as the presence of larger amounts of water there would, it is true, be only two phases; but the zein solution would not be sufficiently concentrated and the extraction of the color would be incomplete.

The applicant's discovery that aqueous isopropyl alcohol can be used in a wide range of extracting conditions and give satisfactory yields of zein of the desired quality, coupled with the discovery that the extract with aqueous isopropyl alcohol can be treated for oil and color removal by hexane or its equivalent, which, for the reasons stated is not a desirable oil and color solvent when used in connection with ethyl alcohol extractions, has resulted in advantages, as have been indicated, in both the extraction step and the oil and color removal step of the process.

A further object of the invention is to provide a convenient, economical method of producing zein which will be continuous in its operation. The continuity of the process is important because of economy and also to avoid precipitation of the zein which may ocur if the process is interrupted for considerable periods of time.

The process of the present invention, in its preferred embodiment, is disclosed in the accompanying drawing which is a flow sheet of the extraction process.

Referring to the drawing, gluten meal from the storage vessel 1 and isopropyl alcohol from the alcohol heater 2 are introduced into the extractor 3, which may be of any suitable type of extracting apparatus but is preferably a continuous extractor so as not to interrupt the continuity of the process which throughout is, preferably, a continuous process.

The isopropyl alcohol may vary in concentration from 80% to 92%, by volume, or thereabouts, the preferable concentration being 85%. The amount of alcohol may vary between 2 and 5 times the weight of the meal, the preferred amount being 3.5 times.

The alcohol is heated so as to give a temperature in the extractor of from 30° C. to 65° C. (86° F.–149° F.), the preferred temperature being 60° C. (140° F.). The lower alcohol concentrations tend to give higher yields but at the sacrifice of solubility and solution stability in the higher concentrated alcohols, say ethyl alcohol of 95% concentration by volume. At the lower temperatures the yields will be reduced and the rate of extraction slowed down. If the extraction temperature is too high there is danger of denaturing the zein. Taking all factors into consideration, the best results, it is believed, are obtainable by using an 85% isopropyl alcohol and an extraction temperature of 60° C. (140° F.). This will give a yield of 50% protein, based on the weight of the gluten meal protein content and at the same time exclude protein fractions which impair solubility and solution stability.

From the extractor 3 the extract goes to the cooler 4 where its temperature is reduced to 15° C. (59° F.), and the spent meal to the recovery system (not shown). The cooled solution is filtered at 5 upon a suitable filter, such for example as a precoat vacuum filter, and the filter cake sent to the recovery system. The filtrate (zein-alcohol solution) is mixed in the mixer 6 with the solvent for oil and coloring matter, hexane or its equivalent, as hereinabove defined. With the alcohol concentrations contemplated by this invention in the extraction step, a considerable amount of the oil and coloring matter of the gluten meal is extracted with the zein. The quantity of hexane may vary from 30–100 parts, by volume, of hexane to 100 parts of solution, the preferred quantity being 80 parts by volume of hexane to 100 parts of the alcohol zein solution. From the mixer 6 the material goes to the centrifugal or gravity separator 7 which makes a primary separation between the alcohol solution of zein, which goes to the heater 8, and the hexane, oil and coloring matter which, with some protein and alcohol, goes to the recovery system. The alcohol solution of zein sent to heater 8, where it is heated by alcohol vapor, will contain some hexane which is removed in the solvent flasher 9, operated under vacuum, the temperature being such as to cause the vaporization of the hexane which, after condensation, is sent to the hexane recovery system.

The zein solution from the solvent flasher 9 is then sent to the zein precipitation apparatus 10 in which the zein is precipitated by contact with water. The process is preferably that described and claimed in the copending application of Horesi, Flint and Swallen, Serial No. 214,512, filed June 18, 1938, (Patent No. 2,238,591, issued April 15, 1941) in which the zein solution is sprayed into a continuous stream of water which passes into a flotation vessel in the water of which alcohol is maintained at a concentration of about 10% by volume. The precipitated zein is collected from the water into which it is sprayed and is ground in the dispersing apparatus 11 into a thick, finely dispersed paste and is then spray dried at 12. The hexane from the solvent flasher 9 and the 10% alcohol from the precipitation apparatus 10 are sent to the recovery system. The zein discharged from the drier 12 is the finished and purified product.

One of the advantages of using isopropyl alcohol as a zein solvent and hexane as an oil solvent instead of using ethyl alcohol and benzol is that a better separation is effected as between the zein and the oil solvent, less hexane being disolved in the heavy zein and hexane being more volatile is distilled off at lower temperatures and with the removal of less alcohol. This refers particularly to the separation at 9. There is also an advantage in the separation at 7. Less hexane is required than benzol; the layers separate more readily, and the solvent layer carries less zein.

The separating operation at 7 must involve the removal with the zein of a large enough quantity of alcohol to give a heavy concentrated zein solution suitable for precipitation. If the zein solution is too thin, the zein will precipitate in too fine a state to be readily removed from the water. This means that it is necessary to use relatively high concentrations of isopropyl alcohol because if too much water is present in the operation at 7, it will pull the alcohol away from the hexane and give too dilute a zein solution for practical precipitation.

While the process has been described in a preferred embodiment, it will be understood that the intention is to cover all equivalents as well as all modifications within the scope of the appended claims. In the matter of extraction temperature, this temperature might be quite considerably reduced but with no advantage and the very important disadvantage of reduced yields. Yields might be increased by raising the temperature above the preferred range of specified above, but with the danger of denaturing the zein. The concentration of the isopropyl alcohol might be increased, above the range indicated, but at the sacrifice of yield; while, on the other hand, the concentration might be decreased with perhaps some increase of yield but with impairment of solubility and solution stability.

I claim:

1. Process of obtaining zein from corn gluten which comprises: extracting the zein with aqueous isopropyl alcohol of a concentration and at a temperature which also extracts oil and coloring matter; mixing hexane with the zein solution; and separating the hexane, oil and coloring matter from the alcohol zein solution.

2. Process of obtaining zein from corn gluten which comprises: extracting the zein with aqueous isopropyl alcohol of a concentration and at a temperature which also extracts oil and coloring matter; mixing with the zein solution a petroleum hydrocarbon having a boiling point substantially within the range of 122° F.–212° F. whereby a two-phase separation is possible between the alcohol-zein solution and the petroleum hydrocarbon, oil and coloring matter; and separating the petroleum hydrocarbon, oil and coloring matter from the alcohol-zein solution.

3. Process of obtaining zein from corn gluten which comprises: extracting zein with aqueous isopropyl alcohol of a concentration between 80% and 92%, by volume; mixing with the zein solution a petroleum hydrocarbon having a boiling point substantially within the range of 122° F.–212° F.; and separating the petroleum hydrocarbon, oil and coloring matter from the alcohol-zein solution.

4. Process for obtaining zein from corn gluten which comprises: extracting the zein with aqueous isopropyl alcohol of a concentration between 80% and 92%, by volume, and at a temperature between 86° F. and 149° F.; mixing hexane with the zein solution whereby a two-phase separation is possible between the alcohol-zein solution and the hexane, oil and coloring matter; and separating the hexane, oil and coloring matter from the alcohol-zein solution.

5. Process for obtaining zein from corn gluten which comprises: extracting the zein with aqueous isopropyl alcohol of a concentration between 80% and 92%, by volume, and at a temperature between 86° F. and 149° F.; mixing with the zein solution a petroleum hydrocarbon having a boiling point substantially within the range of 122° F.–212° F. whereby a two-phase separation is possible between the alcohol-zein solution and the petroleum hydrocarbon, oil and coloring matter; and separating the petroleum hydrocarbon, oil and coloring matter from the alcohol-zein solution.

6. Process of obtaining zein from corn gluten which comprises: extracting the zein with aqueous isopropyl alcohol of a concentration and at a temperature which also extracts oil and coloring matter; mixing with the zein solution a petroleum hydrocarbon solvent having a boiling point substantially within the range of 122°–212° F. and separating the petroleum hydrocarbon solvent, oil and coloring matter from the alcohol zein solution.

7. Process of obtaining zein from corn gluten which comprises: extracting the zein with aqueous isopropyl alcohol; mixing with the resultant alcoholic solution of zein a petroleum hydrocarbon having a boiling point substantially within the range of 122° F.–212° F.; and separating the petroleum hydrocarbon, oil and coloring matter from the alcohol-zein solution.

LLOYD C. SWALLEN.